Patented May 12, 1942

2,282,792

UNITED STATES PATENT OFFICE 2,282,792

STABILIZATION OF GLYCERIDE OILS

Sidney Musher, New York, N. Y., assignor to Musher Foundation Incorporated, New York, N. Y., a corporation of New York No Drawing. Application February 4, 1942, Serial No. 429,506

7 Claims. (Cl. 260—398.5)

This invention relates to the use of yeast, particularly brewers' dried yeast, which yeast has been heated to a sufficiently high temperature to kill the yeast cells and to inactivate those organisms which produce fermentation. The yeast is desirably filtered from the beer after the fermentation of the beer has been completed and is then dried.

The inactivated yeast freed of fermentative organisms and in combination with molasses is used in a major proportion as the aqueous continuous phase with a minor proportion of a glyceride oil dispersed therein to stabilize the oil against oxidative deterioration.

The yeast is filtered from the beer and is dried desirably at a temperature of over about 150° F. and preferably at some stage in the drying operation the temperature is increased to approximately 200° F. in order to kill off the fermentative organisms of the yeast.

There may also be utilized the water soluble constituents contained in yeast prepared by extracting the yeast in a slightly acidified water or alcohol or mixtures thereof and then concentrated after extraction to over about 50% total solids.

The water soluble extract of the yeast which is extracted by a slightly acidified water and at a temperature between about 125° F. and 145° F. is either before, during or after extraction rendered substantially free of fermentative organisms.

It is quite important that the extract after preparation from the yeast be concentrated to between 40% and 75% total solids or more.

The temperature of extraction may be between about 125° F. and 145° F. provided the fermentative organisms have already been killed off in the yeast. However, where there still remains any live cells in the yeast, the extraction should proceed for the shortest possible time such as for less than 30 minutes at a temperature of not in excess of about 115° F. and preferably at room temperature.

As an example of the method of preparing such extract from yeast, the yeast is desirably first pressed to a paste containing in excess of about 30% total solids or dried or the yeast may be extracted after having been skimmed off the fermented beer and then pressed to remove extraneous materials. The yeast is desirably finely macerated or ground in order to expose the yeast cells which may then be subjected to a sufficiently high temperature to kill off the fermentative organisms of the yeast. Preferably the yeast is heated in its moist condition to over 150° F. and desirably to about 200° F.

The yeast is then mixed or agitated thoroughly with a quantity of water for a period of about 30 minutes at a temperature of 135° F. The time of agitation may vary from 5 minutes to 2 hours but in order to obtain the maximum yield and the most desirable product, the time period for continuous agitation should be between about 45 minutes and 1 hour.

The temperature of the water at the time of the extraction should not be in excess of about 140° F. to 145° F. nor less than about 125° F. to 130° F.

The water used should be substantially free of minerals and desirably free of iron and copper. Where the water normally has a pH above 7.0, it should be acidified to reduce the pH. Preferably, in order to obtain a clear supernatant water containing the extract, and to obtain the most desirable type of extract, the pH of the water should be adjusted to between 4 and 7 and preferably to about 5 to 6 by addition of a mineral acid such as hydrochloric, sulphuric or phosphoric, or an organic acid such as acetic, tartaric, citric, etc., or by the addition of acid salts such as acid sulphates or phosphates. This adjustment may take place during or before the extraction. The pH adjustment will also serve to increase the rate at which insoluble material will settle out leaving a clear supernatant water portion containing the extract.

Any quantity of water may be used to produce a free flowing mixture. One part of yeast should preferably be mixed with about 4 parts of water by weight. Other proportions may also be used such as from 4 to 15 parts of water to every 1 part of yeast.

Another very satisfactory method is for the yeast to be ground or milled with sufficient water to produce a paste and whereby the cell structure of the yeast is so broken into as to permit the maximum solubility of the water extractable substances into the water. Then the pulpy aqueous mass may be pressed or centrifuged or otherwise treated to remove the aqueous solution containing the extract. Preferably the same temperature and acidity are employed as above. The solution may be clarified or filtered or where additional water is added, allowed to settle out.

Where the yeast-water suspension is allowed to stand for settling out, and after the 30 minute agitation and extraction period, the solution should desirably be cooled by placing it in a jacketed or coiled vat or by running water through cooling coils immersed therein or by adding cold water to the hot yeast-water suspension, so that the temperature of the water is reduced from 135° F. to from 80° F. to 105° F. and preferably to about 100° F. in order to avoid changes during the settling period. The solution thus cooled may then be treated to remove the yeast insoluble portions. This may be accomplished by allowing the solution to settle for from 2 to 12 hours until a substantially clear unfermented supernatant liquid is formed which liquid is removed by decanting, siphoning, or similar process.

The solution containing the yeast may also be subjected to a continuous centrifuging whereby all undissolved material is removed as a continuous operation.

The substantially clear solution thus obtained should desirably be evaporated by vacuum distillation at about 135° F. to approximately between 45% and 75% solids and desirably to about 70% solids and to a Baumé of 37°. After the proper solids content has been reached, the extract should desirably be subjected to superheated steam in the vacuum pan in order to raise the temperature of the extract to 200° F. for about 10 minutes in order to sterilize it and also retain its full stabilizing properties for longer periods.

The evaporating temperature may vary, dependent upon whether vacuum or atmospheric pressure is used. Although it is desirable to use vacuum evaporation, evaporation at atmospheric pressure may also be employed.

The concentrated extract may also be packed in cans or other containers and sterilized at 200° F. to 250° F. for 10 to 30 minutes.

Where, due to prolonged sterilization or high heat during such sterilization, a coagulation or precipitation is formed resulting in the production of insoluble matter, such precipitate may be filtered or otherwise removed. Distilled or softened water is desirable as the extracting medium and will avoid, to a large degree, such precipitation and coagulation.

Where drying is desirable, the concentrated water extract may be dried on trays, preferably under vacuum and a desirable dried product will be obtained. Drum drying is difficult in view of the mucilaginous nature of the extract by means of which the extract adheres to the drum and cannot readily be scraped off. Spray drying may less preferably be resorted to in view of the oxidation occurring during the spray drying operation.

In the preparation of the water extract of the yeast, where desired a carrier may be employed in the drying of the extract. For example, the concentrated water extract of the yeast may be mixed with condensed skim milk, on the basis of using from 5% to 60% by weight of the extract (on its solids basis) against the solids weight of the skim milk and the thoroughly mixed combination of the extract and skim milk dried on a drum drier or otherwise dried. The skim milk absorbs the gummy characteristics of the extract and permits much easier drying than where the extract is dried alone.

There is obtained a combined action of the milk ingredients with the extract to further increase the stabilizing action of the extract. The drying may be done preferably on a hot roll and the dried film scraped off after drying. Less preferably the mixture may be dried by spraying into a heated chamber.

Other carriers may also be employed and particularly salt and sugar. The extract may, for example, be mixed with salt or sugar using from 1% to 20% of the extract and 99% to 80% of the salt or sugar and preferably applying the concentrated extract to the sugar or salt crystals by spraying such extract on the crystals while they are kept at above 180° F. and desirably at between 250° F. and 300° F. so that the extract dries on the surface of the crystals of the salt or sugar.

For example, as the salt crystals leave the kiln at 275° F., the extract containing 30% water may be heated to 170° F. and sprayed on the salt crystals, applying 2% on the solids basis to the salt in this manner, thereby obtaining a completely soluble product. The extract may be applied to sugar such as to refined cane or beet sugar or to dextrose at the centrifugals to obtain complete admixture with and absorption upon the sugar crystals.

The yeast or its extracts, desirably in concentrated form, may be dissolved or dispersed in molasses, such as in crude blackstrap molasses, and less preferably in refinery blackstrap molasses, sorghum molasses, invert molasses or beet molasses, and the molasses containing the yeast then serving as the continuous phase for the dispersion of a minor amount of a glyceride oil therein, such as for dispersing codliver oil, halibut liver oil, and other glyceride oils.

Under these circumstances the glyceride oil is very materially improved in keeping quality and is stabilized against oxidative deterioration.

For example, a mixture may be prepared comprising 5% of the yeast in molasses and the molasses containing the 5% of yeast then used as the aqueous continuous phase for the dispersion of about 15% of codliver oil which codliver oil may be homogenized in the molasses containing the yeast. The mixture may then be subjected to an elevated temperature of 250° F. or above to further enhance the antioxygenic effect.

Among the glyceride oils that may be treated are included the fish and fish liver oils, lard, tallow, oleo oil, cottonseed oil, corn oil, soya bean oil, castor oil, codliver oil, tea seed oil, olive oil or other animal or vegetable oil or fat either in substantially crude, refined or hydrogenated condition.

Following the dispersion of the glyceride oil in a major amount of the inactivated yeast or its extract and molasses, the combination may be dried desirably under vacuum or inert gas such as by combining with bran or other carrier to hold the oil dispersed material.

The final product composed of oil dispersed in the yeast-molasses combination is desirably subjected to an elevated temperature in excess of about 170° F. and desirably to about 250° F. or above, to obtain marked enhancement of antioxygenic effect.

In all cases the glyceride oil is used in a minor amount of less than 25% for dispersal in the major amount of the yeast-molasses combination.

The inactivated yeast or its extract is desirably used in substantially concentrated condition having over 50% total solids and the amount of yeast or its extract desirably does not exceed about 25% against the weight of the molasses with which it is combined before serving as the medium into which the glyceride oil is dispersed.

Alcohol may also be used as the extractant from the yeast which has been freed of fermentative organisms and particularly the lower molecular weight alcohols which have been slightly acidified and with or without a small quantity of water also present at the time of extraction.

The extract may also be mixed with fully water miscible or partly water miscible organic solvents such as, for example, acetone, or alcohols and particularly the higher molecular weight aliphatic alcohols such as butyl alcohol, to precipitate and remove undesirable materials. If desired, it is also possible, although less preferable, to use a mixture of water and these organic solvents as extracting agents, preferably in slightly acidified condition. Or, on the other hand, the organic solvents themselves may be utilized as the extractant following which they may be evaporated to obtain the concentrate or mixed with water to precipitate therefrom materials not desired in the final concentrate.

The yeast that is utilized in accordance with this invention is preferably brewers' yeast or yeast obtained during the manufacture of beer although yeast obtained from the manufacture of alcohol by molasses fermentation or in distillery operations may also be utilized. Both "top yeast" and "bottom yeast" may be employed.

Dried grains containing high proportions of yeast but free of fermentative organisms or their extracts may also be employed in a similar manner although brewers' yeast is preferable.

In lieu of or in addition to the use of yeast, it is possible, but less preferable to utilize fungi such as mushrooms and their extracts prepared as described.

It is desirable for the yeast or its extract to be added in an amount insufficient to produce any yeast odor or flavor in the food, such as in the butter, bacon or strawberry ice cream, and generally the amount used will be less than about 1%.

Zymase may also be utilized, particularly in its inactive form and after having been subjected to the elevated temperature of inactivation, and preferably in combination with a sugar and where subjected to an elevated temperature of over 170° F. and desirably over 250° F. after addition to the oxidizable composition.

Where desired, the yeast-molasses or yeast extract-molasses combination may be combined with wheat bran, soya flour, corn bran, oat bran, peanut flour or other similar material in order to obtain a substantially dry product. The combination with the bran or soya flour may be dried under inert gas or under vacuum by heating to an elevated temperature of about 150° F. or above.

Preferably the wheat bran, soya flour or other flour serving as a carrier for the combination is first pre-dried so as to reduce its moisture content to about 5% or less and desirably to as low as under 3%, following which the molasses-yeast combination is added to the bran or soya flour serving as the carrier, using about from 60% to 80% by weight of the bran or soya flour and 40% to 80% by weight of the molasses-yeast combination, but where the bran or soya flour is pre-dried, it is not necessary to subject the finished combination to an additional drying operation. Together with or in lieu of the bran or soya flour, there may also be utilized other forms of carriers such as powdered skim milk, powdered whey, etc.

The present application is a continuation in part of application Serial No. 306,815 filed November 30, 1939 and through said application is a continuation in part of application Serial No. 301,758 filed October 28, 1939, now Patent No. 2,198,205 and Serial No. 301,757 filed October 28, 1939, now Patent No. 2,198,206. Through said latter applications there is continued the subject matter of applications, Serial No. 268,341 filed April 17, 1939, now Patent No. 2,176,024, Serial No. 249,990 filed January 9, 1939, now Patent No. 2,176,027, and Serial No. 229,296 filed September 10, 1938, now Patent No. 2,176,028.

Having described my invention what I claim is:

1. A method of stabilizing glyceride oils which comprises dispersing a minor amount of said glyceride oil in a major amount of a combination of molasses and a yeast material selected from the group consisting of inactivated yeast and its water and alcohol soluble extracts.

2. A method of stabilizing glyceride oils which comprises dispersing a minor amount of said glyceride oil in a major amount of a combination of blackstrap molasses and a yeast material selected from the group consisting of inactivated yeast and its water and alcohol soluble extracts.

3. A method of stabilizing glyceride oils which comprises dispersing a minor amount of said glyceride oil in a major amount of a combination of blackstrap molasses and a slightly acidified water soluble extract of inactivated yeast.

4. A method of stabilizing glyceride oils which comprises dispersing a minor amount of said glyceride oil in a major amount of a combination of molasses and a yeast material selected from the group consisting of inactivated yeast and its water and alcohol soluble extracts, and then heating to over 170° F. to obtain enhanced antioxygenic effect.

5. A substantially stabilized glyceride oil composition comprising a dispersion of a minor amount of a glyceride oil in a major amount of a combination of molasses and a yeast material selected from the group consisting of inactivated yeast and its water and alcohol soluble extracts.

6. A substantially stabilized glyceride oil composition comprising a dispersion of a minor amount of a glyceride oil in a major amount of a combination of blackstrap molasses and a yeast material selected from the group consisting of inactivated yeast and its water and alcohol soluble extracts.

7. A substantially stabilized glyceride oil composition comprising a dispersion of a minor amount of a glyceride oil in a major amount of a combination of blackstrap molasses and a slightly acidified water soluble extract of inactivated yeast.

SIDNEY MUSHER.